T. E. MURRAY, Jr.
METHOD OF AND APPARATUS FOR ELECTRICAL WELDING.
APPLICATION FILED NOV. 9, 1917.

1,259,272.

Patented Mar. 12, 1918.

INVENTOR
Thomas E. Murray Jr.
BY
ATTORNEY

UNITED STATES PATENT OFFICE.

THOMAS E. MURRAY, JR., OF BROOKLYN, NEW YORK.

METHOD OF AND APPARATUS FOR ELECTRICAL WELDING.

1,259,272. Specification of Letters Patent. Patented Mar. 12, 1918.

Application filed November 9, 1917. Serial No. 201,011.

*To all whom it may concern:*

Be it known that I, THOMAS E. MURRAY, Jr., a citizen of the United States, residing at Brooklyn, in the county of Kings and State of New York, have invented a certain new and useful Improvement in Methods of and Apparatus for Electrical Welding, of which the following is a specification.

The invention is a method of and apparatus for electrical welding. One of the bodies to be welded is electrically heated to a plastic state. The other body is normally not heated, and is supported away from said heated body. While the heated body is plastic, contact is established between said bodies, and the same are pressed together to cause them to unite.

In the accompanying drawings—

Figure 1:
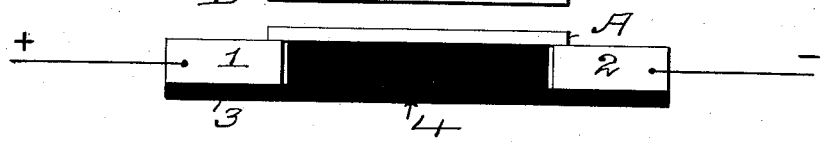
Figure 2:
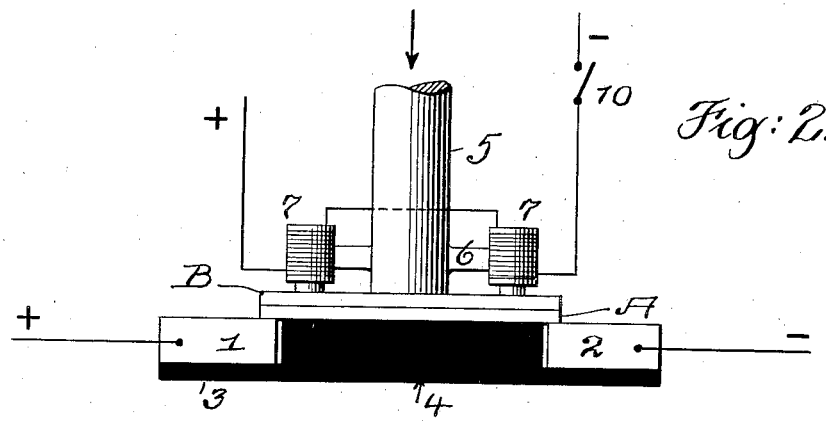
Figure 3:
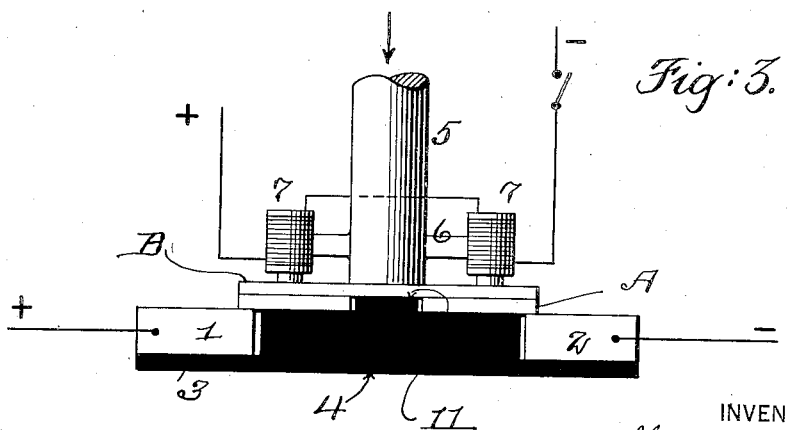

Figure 1 is an elevation of my welding apparatus, showing one of the plates raised above and separated from the other. Fig. 2 is a similar elevation, showing the plates in welding contact. Fig. 3 is a similar elevation, showing the plates in welding contact, the lower plate here having an opening which is closed by the upper plate.

Similar numbers and letters of reference indicate like parts.

1 and 2 are electrodes, supported upon the table 3 of insulating material. On said table is an upward projection 4 of the same height as electrodes 1, 2, and disposed between said electrodes. The lower plate A to be welded rests upon said electrodes 1, 2 and said projection 4.

5 is a vertically moving rod, having arms 6 which support electro-magnets 7, 7. The lower faces of the cores of said magnets and the lower face of rod 5 lie in the same plane.

B is the upper plate to be welded. Said plate B is of inductive material, and when the rod 5 is in raised position, as shown in Fig. 1, and the electro-magnet circuit is closed, as by a switch 10, said plate is attracted by said electro-magnets, and is so held, when the rod 5 is raised away from plate A.

The operation is as follows: The parts being as shown in Fig. 1, welding current is established to electrodes 1, 2. The lower plate A is thus heated to a plastic state. The upper plate B is not heated. The upper plate B is moved down by the descent of rod 5, and brought into contact with and pressed against the plastic lower plate A, thus effecting the desired union between said plates.

After plate B makes contact with plate A, then a portion of the welding current becomes diverted from plate A to plate B, and tends to warm the same, and so prevent chilling of plastic plate A by contact with the comparatively cool plate B to an extent sufficient to impair the welding together of said plates. The circuit is then broken at switch 10, as shown in Figs. 2, 3, to cause the magnets to release plate B, after which the rod 5 is raised and the welded plates removed from the apparatus.

Where it is desired to use one plate, as B, to cover a hole in the other plate A, I provide on the upper surface of the projection 4, a smaller projection 11, adapted to enter said hole and support the plate B after the same has been moved into contact with plate A.

Where the upper plate B presents a comparatively small mass of metal as compared with plate A, and is therefore not liable materially to cool said plate A, the current to electrodes 1, 2 can be interrupted as soon as the plate A reaches the plastic state—it being understood, of course, that the plate B should be lowered immediately after said interruption into welding contact with said plate A.

I claim:

1. The method of electrical welding, which consists in electrically heating one of two bodies to be welded to a plastic state, the other body not being so heated, and then establishing contact between said bodies and subjecting the same to pressure in a transverse direction, whereby said bodies are caused to unite.

2. An electrical welding apparatus, comprising means for supporting one of two bodies to be welded, means for electrically heating said body to a plastic state, means for supporting the other of said bodies at a distance from said heated body, and means for pressing said bodies together to unite the same.

3. An electrical welding apparatus, comprising means for supporting one of two bodies to be welded, means for electrically heating said body to a plastic state, means for pressing the other of said bodies against said heated body, and, on said pressing means, means for supporting said non-heated body.

4. An electrical welding apparatus, as in claim 3, the said supporting means being electrically operated.

5. An electrical welding apparatus, as in claim 2, the said pressing means being a vertically moving rod, and the said supporting means being electro-magnets carried by said rod.

In testimony whereof I have affixed my signature in presence of two witnesses.

THOMAS E. MURRAY, Jr.

Witnesses:
GERTRUDE T. PORTER,
MAY T. McGARRY.